United States Patent [19]

Meuleman et al.

[11] 3,853,487
[45] Dec. 10, 1974

[54] METHOD OF FORMING CRYSTALS BY THE CONTROL OF VOLATILE CONSTITUENT DIFFUSION PATH DISTANCES THROUGH A MELT

[75] Inventors: Johannes Meuleman, Caen; Guy Michel Jacob, Rosel, both of France

[73] Assignee: U.S. Philips Corporation, New York, N.Y.

[22] Filed: Mar. 9, 1973

[21] Appl. No.: 339,541

[30] Foreign Application Priority Data
Mar. 15, 1972 France .............................. 72.09009

[52] U.S. Cl. ......................... 23/301 SP, 23/273 SP
[51] Int. Cl. ............................................. B01j 17/00
[58] Field of Search .......... 23/294, 301 SP, 273 SP; 148/189, 174

[56] References Cited
UNITED STATES PATENTS

| | | | |
|---|---|---|---|
| 3,077,384 | 2/1963 | Enk et al. | 23/273 SP |
| 3,198,606 | 8/1965 | Lyons | 23/301 SP |
| 3,481,711 | 12/1969 | Maruyama | 23/273 SP |
| 3,488,157 | 1/1970 | Koffer | 23/301 SP |
| 3,507,625 | 4/1970 | Deyris | 23/301 SP |
| 3,519,399 | 7/1970 | Kyle | 23/301 SP |
| 3,573,967 | 4/1971 | Pfann et al. | 148/174 |
| 3,628,998 | 12/1971 | Blum et al. | 23/301 SP |

FOREIGN PATENTS OR APPLICATIONS

| | | | |
|---|---|---|---|
| 1,546,509 | 11/1968 | France | 23/301 SP |

Primary Examiner—Norman Yudkoff
Assistant Examiner—Frank Sever
Attorney, Agent, or Firm—Frank R. Trifari; Norman N. Spain

[57] ABSTRACT

Method of producing a rod shaped crystal of a compound from a liquid solution as the compound in a solution containing as a solvent a constituent of the compound and to which there is constantly supplied with a constituent of the compound more volatile than the solvent.

12 Claims, 4 Drawing Figures

METHOD OF FORMING CRYSTALS BY THE CONTROL OF VOLATILE CONSTITUENT DIFFUSION PATH DISTANCES THROUGH A MELT

The present invention relates to a method of forming in a space rods of a compound from a liquid solution of said compound in at least one of the constituents thereof, which solution is continuously supplied with at least one constituent which is more volatile than the solvent, the more volatile constituent diffusing via the solution which shows a concentration gradient of the more volatile constituent, to a crystallization interface present in a steep temperature gradient, said gradient being gradually traversed by said space.

It is known to manufacture crystalline rods, in particular monocrystalline rods which are required for the semiconductor industry, by crystallisation from a solution. A solution is made of the material to be crystallized. This solution is heated at such a temperature that the concentration thereof lies below the saturation, the solution then traverses a steep cooling gradient, while the surface thereof is continuously supplied with material to be dissolved. A condition adjusts in which the crystallisation rate which normally is determined at the crystallisation interface between solid and liquid phase is equal to the rate at which the liquid traverses the said gradient, which rate has to be equal to the diffusion rate of the dissolved material in the solution and which may be expressed by the formula:

$$v = D \ C_s - C_i/dh,$$

where

D is the diffusion rate of the dissolved material in the solution, $C_s$ is the concentration of the dissolved material at the surface where the material is added, $C_i$ is the concentration of the dissolved material at the interface between liquid and solid, $d$ is the density of the crystallized solid and $h$ is the diffusion distance in the liquid.

Because one of the advantages of the growing in solution consists of the capability of performing the process at a comparatively low temperature, the temperature of the crystallization interface generally is chosen to be much lower than the melting temperature. The thermodynamic requirements of the monocrystalline epitaxial nucleation in that case requires a very low maximum crystallization rate.

In the case in which a rod of a compound is to be formed, such as, for example, in French Patent specification 1,546,509, it is nearly always possible and very favourable to use at least one of the constituents as a solvent. In that case, however, the quantity of available solvent gradually decreases due to the formation of the solid compound and due to that fact that the solvent is nor replenished. The distance $h$ in the above-mentioned formula which hereby determines the rate of growth of the crystal is variable. The rate of movement of the space with the liquid through the crystallization gradient must thus be varied proportionally, which makes the device used for the performance and which is already complicated due to the low rates used for growing in solution considerably more complicated. In practice, while $h$ is at its maximum, the lowest rate assumed at the beginning of the process is maintained during the whole growth process and the duration of the operation, which is long as it is, is increased by it.

A compensation for varying the distance $h$ could be obtained by means of a variation corresponding to the coefficient D but this would involve a decrease in temperature which would be opposed to the end in view, or by means of a variation corresponding to the difference $C_s - C_i$. Because $C_i$ is to be considered as a constant since it is determined by the constant crystallization temperature, $C_s$ would thus have to vary further. $C_s$, however, depends upon various factors including the temperature at the surface of the solution. This temperature can be controlled the more difficult because it relates to a point the distance of which varies with the height. The control of a variable surface concentration turns out to be too delicate.

A special object of the present invention is to mitigate the drawbacks of the known methods. Another object of the invention is to enable the growth in a solution of a crystal of a compound at an optimum constant crystallization rate.

According to the invention, the method of manufacturing in a space rods of a compound from a liquid solution of the said compound in at least one of the constituents thereof, which solution is constantly supplied with at least one constituent which is more volatile than the solvent, the more volatile constituent diffusing, via the solution which shows a concentration gradient of the more volatile constituent, to a crystallization interface present in a steep temperature gradient, said gradient being gradually traversed by said space, is characterized in that the distance in the liquid between the said crystallization interface on the one hand and another face present between the said volume with the concentration gradient and a superficial liquid layer having a constant concentration which is constantly supplied with the more volatile constituent on the other hand, is maintained constant during the whole crystal growth by the addition of the constituent serving as a solvent.

The distance between the interface between solid and liquid or crystallization face and the liquid layer in which a supply with a constant concentration of one or more more volatile constituents is maintained, is the distance over which a diffusion state of said constituents adjusts or diffusion distance. Since said diffusion distance is constant, no single variation of the other crystallization factors is necessary and it is possible to maintain a constant crystallization rate. The constancy of the rate of movement of the space with the liquid which must preferably remain equal to the crystallization rate simplifies the problems which are inherent in said movement which generally is particularly low, for example 1mm per day, and permits substantially no irregularities. The constant rate assumed in the method according to the invention must be equal to the highest rate which is permitted by the thermodynamic requirements for the nucleation.

The constancy of the diffusion distance facilitates the maintenance of stable temperatures and constant temperature gradients. The stability of all the crystallization conditions during the process which usually is very long, is a quality factor for the resulting crystal.

According to a preferred embodiment of the method according to the invention the solution in the liquid phase is constantly supplied by supplying a constituent in the vapour form to the surface of the liquid solvent, in which the pressure of said vapour is determined by the temperature at which a mass of said constituent which is provided in the liquid or solid phase is heated in a container which communicates with the surface of the liquid solvent. The container and its contents are preferably provided so that they remain unvariable relative to the surface of the volume of the solution to which the constituent in vapour form is supplied out and relative to the crystallization interface. In this embodiment the container is immovable relative to the heating means which facilitates the maintenance of the contents of the said container at a constant temperature and thus a constant vapour pressure at the surface of the liquid solvent.

Since the solvent is a constituent of the crystallized compound, the volume of the available liquid solvent decreases during crystallization and liquid solvent should be added.

The constancy of the diffusion distance can be obtained in various manners. According to a first embodiment the surface of the liquid is constantly supplied with one or more volatile constituents in the vapour phase and maintained at a constant distance from the crystallization interface.

In this case the layer having a constant concentration is reduced to the surface layer of the liquid which is in contact with the vapour phase.

The method can thus be carried out by means of a tube which is dipped in the solution. This tube comprises the liquid to be added and the pressure which is determined by the height of the liquid in said tube added to the pressure which is exerted on the surface of the liquid in said tube comes in equilibrium with the pressure prevailing above the surface of the liquid outside the said tube, which last mentioned pressure is determined, for example, by the vapour pressure of the material in the container. A variation of the same method consists of using the dip tubes as a container, the solvent to be added being added from outside said tube.

According to this method and the abovementioned variation, the level of the solution is stabilized by controlling the pressure exerted on the surface of the liquid to be added, the manometric height variation of said liquid being taken into account, said variation being due to the consumption of the solvent at the crystallization level. Since the said manometric height decreases, the pressure at the surface thereof must gradually become higher so as to compensate for said decrease. Therefore a volume decrease of an adjacent gas, for example, argon above the surface of the liquid to be added is preferably used.

In accordance with the properties of the materials used as a solvent and as a solution, it is usually possible to determine the dimensions of the growth device and in particular the dimensions of the supply tube and of the volume of the adjacent gas so that the lowering of the crystallization space relative to the heating means causes the desired reduction of said gas volume, and the constancy of the level of the supplied surface and hence that of the level of the layer having a constant concentration relative to the crystallization interface is obtained without control from without.

According to another embodiment of the method according to the invention, the material to be dissolved is brought in the liquid phase in a first volume of liquid solvent which is distinguished from the volume in which diffusion takes place, the said first volume being constantly made homogeneous and both volumes being separated by a wall which us fixed relative to the heating means which ensure the temperature gradient and consequently fixed relative to the crystallization interface, the said wall being permeable to the solution and preventing the transfer of dynamic effects from one volume to the other. The wall which separates the supplied and stirred volume from the diffusion volume is, for example, a thick perforated wall or simply a porous wall. Since the first volume is continuously made homogeneous, the concentration thereof is everywhere equal and this volume forms a layer of constant concentration. At the level of this wall the concentration which is equal to the surface concentration is constant and the diffusion distance which is considered in the formula which expresses the crystallization rate is the distance which separates said wall from the crystallization interface, which distance is kept constant. On the other hand, the wall prevents the movement of the liquid of the first volume from being felt in the volume of the liquid in which the diffusion takes place.

The supply of the first volume of one or more volatile constituents can be carried out within the space with the liquid volume in which the diffusion takes place, the volatile constituents are placed in the space, preferably at a fixed point relative to the heating means, above the surface of the liquid of the first volume and stirring means are arranged inside the said space. For example, a stirrer which is dipped in the first volume of liquid is slowly rotated so as not to produce any vibrations or too brisk movements of the liquid, in which the speed of the liquid along the permeable wall, however, must be at least several orders of magnitude higher than the crystallization rate. The crystallization rate is, for example, of the order of 1 mm per day and the rate of movement of the liquid in the first volume is of the order of 1 mm per second.

In another embodiment, the supply of a first volume of liquid occurs outside the space and two ducts which open into the latter enable a permanent circulation of the liquid in a closed circuit between the point of supply and the above permeable wall. The liquid circulation is a forced circulation or preferably natural circulation. The circulation rate must be much higher than the crystallization rate. The layer of liquid which is in contact with the wall is continuously refreshed, its concentration is constant and the invariable diffusion distance is the distance which separates said wall from the crystallization interface.

The present invention also relates to a device for carrying out the above-characterized method and the above-described variations thereof. These devices comprise a vertical closed space the lower end of which is shaped so as to possibly receive a nucleus, heating means which are provided outside the said space and relative to which the latter is movable in a vertical direction, means to slowly lower the said space to the said heating means. These devices are especially characterized in that a container which is provided inside the said space comprises a permeable lower wall and a means for stirring the liquid near said wall, means being passed through the wall of said space to maintain the said wall in a fixed position relative to the said heating means.

The invention may be applied to the manufacture of monocrystalline rods of semiconductor compounds by means of the method of growing in solution, especially in the case in which a rod must have a considerable length. The method according to the invention enables of profiting by all the advantages of said method, which advantages result from the assumed comparatively low temperatures and, in good conditions, as regards the reproducibility and the homogenization, of obtaining rods having a minimum of impurities and a minimum of crystal defects.

The method according to the invention is particularly suitable for the manufacture of both monocrystalline and polycrystalline semiconductor rods of III–V compounds, in particular gallium phosphide, the melting method of which shows great difficulties.

The invention will be described in greater detail with reference to the accompanying drawings.

Figure 1A:
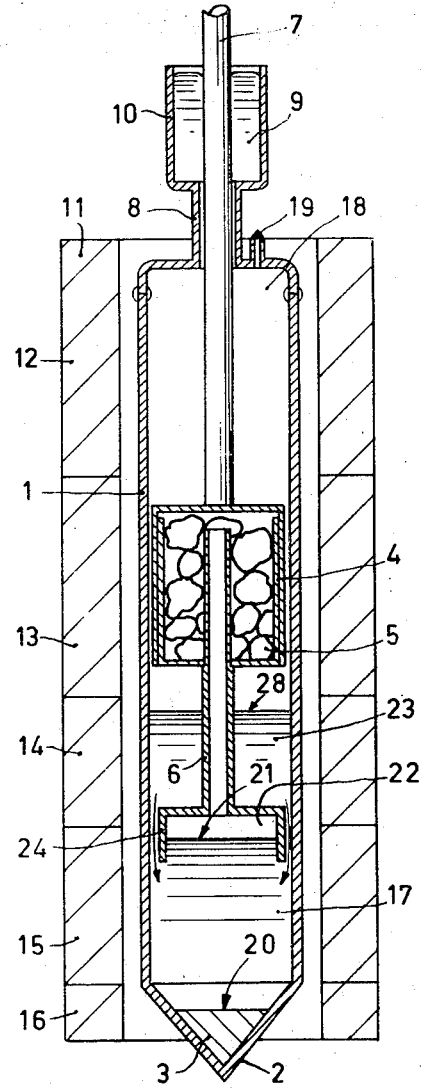
FIG. 1a and 1b are diagrammatic sectional views of a device for carrying out the method according to the invention at the beginning and the end of the crystallization.
Figure 1B:
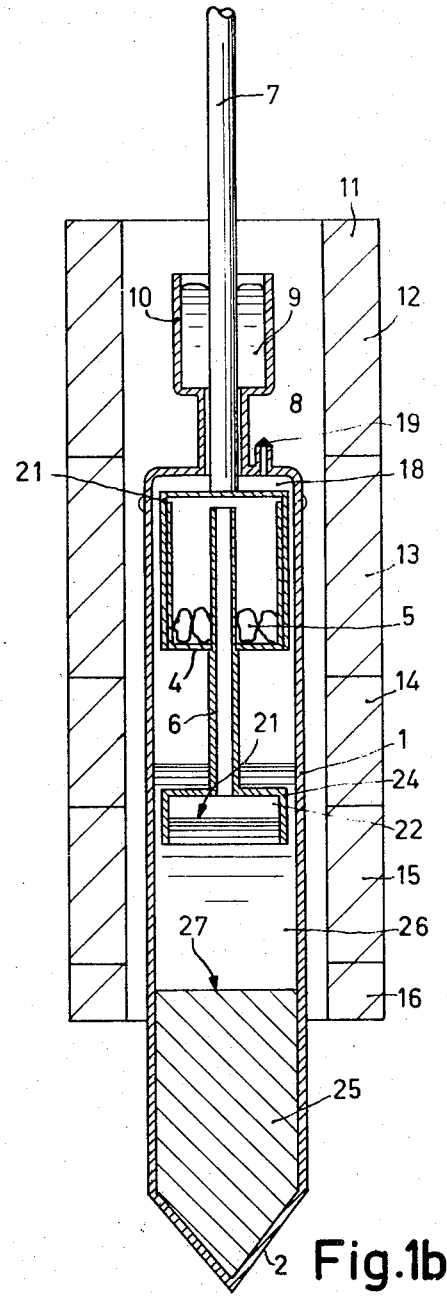

The device for forming single crystals of a binary compound from a solution, which is shown in FIGS. 1a and 1b, uses one of the constituents as a solvent, the other constituent being supplied in the vapour phase by sublimation.

The solution is contained in a vertical closed space 1 which ends in a cone 2 and in which a seed 3 may be placed. Inside the space 1 a container 4 comprises a constituent 5 of the compound to be formed, in the form of solid parts and communicates via a tube 6 with a bell 24 which is dipped in the liquid. The container 4 is secured to the lower end of a vertical rod 7 the upper part not shown of which is immovable. The rod 7 passes through a wall which comprises a guide tube 8 above which a liquid packing is placed which consists, for example, of a liquid element 9 in a cup 10 and which cannot pollute the atmosphere inside the space 1. The space can be lowered in a furnace 11 in which it is guided by the rod 7, which furnace comprises successively from the top to the bottom: a zone 12 which is adjusted to ensure a comparatively low constant temperature in the part 1 which is at the level thereof, a zone 13 which is adjusted to ensure a downwards increasing temperature in the part which is at the level thereof and the coldest point of which determines the vapour pressure of the constituent 5 inside the container 4 which is at this level, a zone 14 which is adjusted very accurately to ensure a substantially equal temperature in a liquid column 23 which is at the level thereof, the coldest point of the column 23 having to be situated at the bottom of said volume, a zone 15 which is adjusted accurately to show a slight temperature gradient which is destined to maintain in the liquid column 17 which is at the level thereof a concentration gradient of the constituent which diffuses towards the interface liquid-solid, and a zone 16 which is adjusted accurately to show a steep temperature gradient which ensures the crystallization at a fixed level in the space, which space is the interface liquid-solid 20.

The container 4 is first provided with the constituent 5, the space is then provided with the liquid constituent which will serve as a solvent, the container 4 is introduced and the level of liquid is completed. The space 1 is closed and placed in the furnace 11 in the position shown in FIG. 1a. As soon as the desired temperatures are reached, the gas pressure in the space 18 is controlled by means of the gas supply 19 so that the liquid level comes at 21 under the bell 24 and comes at 28 outside said bell. The space 1 is then lowered at the required growth rate, in particular as a function of the height of the liquid column between the surface 21 and the interface 20. This lowering can be obtained by any suitable mechanical means; the mechanical means (not shown) for lowering may consist, for example, of the device described in French Patent Specification 2,039,683. The interface between liquid and solid remains at a fixed level which is that of the crystallization isotherm determined by the gradient of the zone 16. The constituent 5 evaporates and causes in the space 22 a constant vapour pressure which determines the diffusion of said constituent in the liquid mass 17. The said constituent diffuses via said liquid column 17. Since the solvent is also a constituent, it is also consumed as a result of the gradual formation of the crystal. This consumption is compensated for by an addition of the liquid volume 23 which is lowered along the annular space between the bell 24 and the wall of the space 1.

During the formation of the crystal the space 1 is lowered, the bell 24 remains unvaried, the level 28 falls, the pressure which prevails in the volume 18 increases and said volume decreases due to the fact that the pressure in the space 22 remains constant; in this manner the height of the liquid column 17 can remain constant, the diffusion conditions through said column are stable, the crystal evolution is regular and the resulting crystal shows a minimum of defects. At the end of the operation the space 1 is in the position shown in FIG. 1b, a crystal 25 has been formed, the interface between liquid and solid 27 is at the same level as the initial interface 20, relative to the furnace 11, the diffusion length of the dissolved material in the solvent remains unvaried from the beginning of the crystallization.

Figure 2:
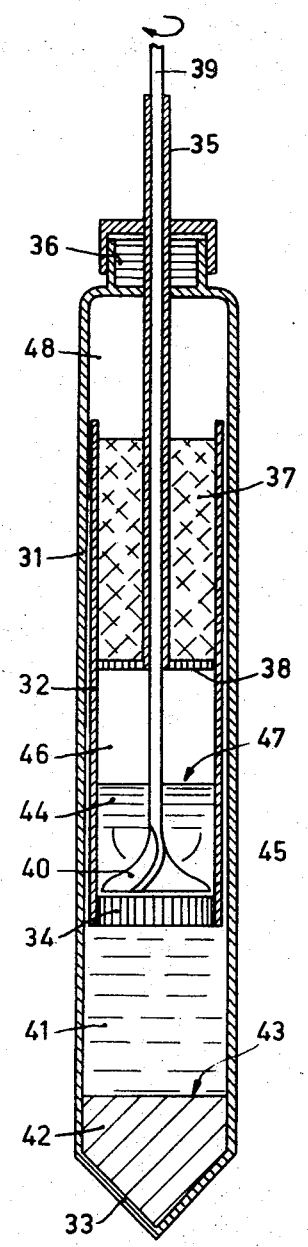
FIG. 2 is a diagrammatic sectional view of another example of the device for carrying out the method according to the invention.

Instead of maintaining the liquid height between the surface layer of the liquid and the crystallization interface constant, the device shown in FIG. 2 makes it possible to maintain the liquid level between a fixed level having a constant concentration present between two liquid volumes and the crystallization interface constant. This device comprises a vertical tubular closed space 31 the lower end 33 of which is conical. The space 31 is vertically movable and a non-movable part is present in said space and comprises: a tube 32 on which the tube 31 slides, a porous bottom 34 and a grid 38 which, with the axial tube 35, constitutes a container for a constituent 37 to be evaporated. A shaft 39 rotates in the tube 35 and comprises a stirrer 40 which is placed near the porous wall 34. A sliding packing 36 ensures the tightness of the space 31. In addition to the constituent 37, the space 31 comprises two volumes of solutions which communicate with each other via the wall 34, namely a first volume 44 which is subjected to internal momvements 45 by means of the stirrer 40 and which as a result has a homogeneous concentration determined by the vapour pressure of the constituent 37 in the volumes 46 and 48, and a second volume 41 in which a diffusion takes place which is directed towards the interface liquid-solid 43. Because the space 31 is slowly lowered in a furnace of the type described with reference to FIG. 1, a crystal 42 is formed by epitaxial growth; the rate of lowering is maintained constant, the diffusion distance is constant, although the level 47 of the first liquid volume varies.

Figure 3:
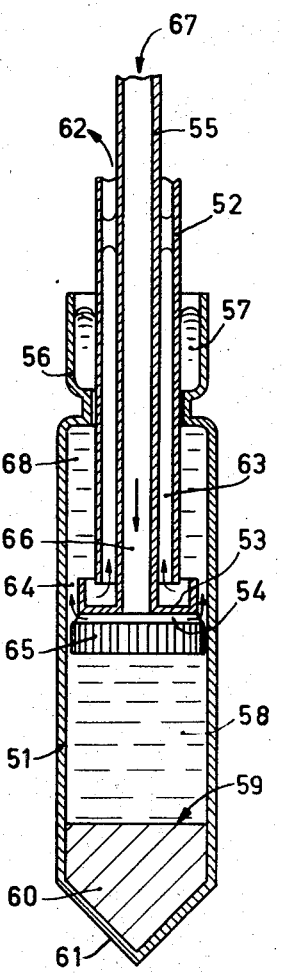
FIG. 3 is a diagrammatic sectional view of a third embodiment of a device for carrying out the method according to the invention.

Just as the device shown in FIG. 2, the device shown in FIG. 3 is destined to keep the liquid height between a fixed level of constant concentration and the crystallization interface constant. This device comprises a vertical tubular tight space 51 the lower end 61 of which is conical and enables the provision of a seed of small dimensions. The space 51 is vertically movable and a non-movable part is present within said space and comprises:

an inner tube 55 and a concentric outer tube 52 along which the space 51 slides, a perforated plate 65 which is adjusted at the inner diameter of the space 51 and at a small distance from the plate 65, a platform 53 which forms a barrier plate for a liquid which emerges from the iner tube at 66 and which leaves again through the outer tube at 62, and which in this manner force said liquid to circulate in contact with the surface of the plate 65. A liquid packing 57 in a cup 56 ensures the tightness of the space 51. This latter comprises two volumes of solution which communicates with each other via the plate 65, namely a first volume 68 of a constantly refreshed liquid due to a forced circulation through the duct of the tubes 55 and 52, and a second volume 58. Outside the device the liquid of the first volume which consists of the solvent is contacted with the other constituents and obtains a concentration $C_s$ which, due to the forced circulation, is made substantially equal in the whole first volume. The concentration of the solution at the level of the plate 65 thus remains constant. A diffusion directed towards the crystallization interface 59 occurs within the liquid volume 58 the height of which is constant. When the space is slowly lowered in a furnace which is of the abovedescribed type but in which the evaporation zone for the constituent may be omitted, an epitaxial deposit is formed on the interface 59 and the crystal 60 grows; the rate of lowering is maintained constant, the diffusion height is constant in spite of the consumption of the solvent.

The various devices described above may be used for the formation of monocrystalline rods of semiconductor compounds, for example the III–V compounds, of which one of the constituents has a sufficiently low melting temperature and can play the part of a solvent, for example gallium or indium, and another constituent is volatile at temperatures which fit in with the mechanical and chemical behaviour of the possible materials of the space, for example, phosphorus or arsenic. The formation of a rod of gallium phosphide is carried out in one of these devices starting from a solution in gallium. The rate of crystallization is maintained constant at 1 mm per day. The diffusion distance is constant and established at 50 mm above the surface of a single crystal. If desired a seed is used of a maximum volume so as to reduce the disturbances of the isotherms as a result of thermal losses through the lower end of the space.

The latter has a diameter of 20 mm and is manufactured from virtreous silicon oxide of high purity. The temperature of the zone in the furnace which corresponds to the charge of phosphorus and which determines the cold tip of the volume determined via the phosphorus vapour is 400°C. The zone which corresponds to the column of solution in which the diffusion takes place shows a light gradient of 1150° to 1100°C and the crystallization zone shows a strong gradient of 1100°C to 1000°C at 10° per mm.

What is claimed is:

1. A method of manufacturing in a space crystalline rods of a compound from a liquid solution of the said compound in at least one of the constituents thereof, which solution is constantly supplied with at least one constituent which is more volatile than the solvent, said more volatile constituent diffusing, through the solution which shows a concentration gradient of the more volatile constituent, to a crystallization interface present in a steep temperature gradient, said temperature gradient being gradually traversed by said space, characterized in that the distance in the liquid between said crystallization interface on the one hand and another face present between the said liquid with the concentration gradient and a portion of the liquid face where said concentration gradient terminates of constant concentration which is constantly supplied with the more volatile constituent on the other hand, is maintained constant during the whole crystal growth by the addition of the constituent serving as a solvent.

2. A method as claimed in claim 1, characterized in that the more volatile constituent is supplied to the surface of the solution in the vapour phase from a container which communicates with said surface, the position of said container and its volatile constituent contents being fixed relative to the said other face of the portion of the liquid which shows a constant concentration gradient relative to the crystallization interface.

3. A method as claimed in claim 2, characterized in that a constant supply of liquid solvent takes place by means of a tube which is dipped in the solution, an equilibrium on either side of the wall of said tube being maintained between the manometric pressure of the supplied liquid and the vapor pressure which prevails above the surface to which the more volatile constituent is supplied.

4. A method as claimed in claim 3, characterized in that the pressure of an inert gas above the surface of the added liquid is gradually increased during the crystallization so as to compensate for the decrease of the manometric height of the supplied liquid.

5. A method as claimed in claim 4, characterized in that the said increase in gas pressure above the surface of the added liquid is obtained by lowering the crystallization space which produces a volume decrease of said gas.

6. A method of claim 2, characterized in that the more volatile constituent is constantly supplied to a supply of a liquid solvent which is separated from the solution in which the diffusion is adjusted by a wall which is permeable to the solution, said wall being fixed relative to the crystallization interface and said supply of liquid solvent is constantly homogenized.

7. A method as claimed in claim 6, characterized in that the said first volume is homogenized by stirring by means of a stirrer.

8. A method as claimed in claim 7, characterized in that the said first volume is homogenized by means of a rotating stirrer which gives the liquid along the said wall a speed which is higher than the rate of crystallization by several orders of magnitude.

9. A method as claimed in claim 6, characterized in that the supply of volatile constituent to the supply of liquid solvent is carried out outside the crystallization space, a circulation of the supplied liquid being ensured between the point of the supply and the said wall.

10. A method as claimed in claim 9 characterized in that the solvent is gallium and the solution is supplied with phosphorus.

11. A device for carrying out the method as claimed in claim 1 which comprises a vertical tight space the lower end of which is formed so as to receive a seed, heating means which are provided outside the said space and in which the latter is vertically movable, and means to slowly lower the said space through the said heating means, characterized in that a container which is arranged inside the said space has a permeable lower wall and means for stirring the liquid above said permeable wall, and means which pass through the wall of said space so as to maintain the said permeable wall in a fixed position relative to the said heating means.

12. A single crystal manufactured by means of the method as claimed in claim 1.

* * * * *